US012701060B1

(12) United States Patent
Spurlock et al.

(10) Patent No.: US 12,701,060 B1
(45) Date of Patent: Aug. 4, 2026

(54) METHODS, SYSTEMS, AND COMPUTER READABLE MEDIA FOR IDENTIFYING RELATIONSHIPS BETWEEN NETWORK APPLICATIONS FROM MONITORED NETWORK TRAFFIC

(71) Applicant: Keysight Technologies, Inc., Santa Rosa, CA (US)

(72) Inventors: Ethan Paul Spurlock, Cedar Park, TX (US); Marc Owen Magnuson, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 166 days.

(21) Appl. No.: 18/807,731

(22) Filed: Aug. 16, 2024

(51) Int. Cl.
H04L 43/04 (2022.01)
H04L 47/125 (2022.01)
H04L 47/2475 (2022.01)

(52) U.S. Cl.
CPC ............ *H04L 43/04* (2013.01); *H04L 47/125* (2013.01); *H04L 47/2475* (2013.01)

(58) Field of Classification Search
None
See application file for complete search history.

(56) References Cited

U.S. PATENT DOCUMENTS 7,702,482 B2   4/2010  Graepel et al.
8,443,074 B2   5/2013  Bahl et al.
8,954,550 B2   2/2015  Zhang et al.
2008/0281979 A1* 11/2008  Keeler .................. H04L 47/803
                                                        709/233
2021/0385071 A1* 12/2021  Watson ................... H04L 9/088

OTHER PUBLICATIONS

Chen, et al., "Automating Network Application Dependency Discovery: Experiences, Limitations, and New Solutions", 8th USENIX Symposium on Operating Systems Design and Implementation, pp. 1-14 (2008).

Fences Chen, et al., "Automating Network Application Dependency Discovery: Experiences, Limitations, and New Solutions", 8th USENIX Symposium on Operating Systems Design and Implementation, pp. 1-14 (2008).

Bahl, et al., "Towards Highly Reliable Enterprise Network Services Via Interference of Multi-level Dependencies", SIGCOMM '07, pp. 1-13 (Aug. 27-31, 2007).

* cited by examiner

*Primary Examiner* — Tonia L Dollinger
*Assistant Examiner* — Ishrat Rashid

(57) ABSTRACT

A method for identifying dependencies between network applications includes determining, from the network traffic or the network traffic metadata, counts indicating numbers of times that applications residing on the web servers are contacted after the same and other applications residing on the web servers and computing, using the counts and for each of the applications, a contact probability. The method further includes computing, using the counts and for each of the applications, an observed probability indicating a likelihood that the application will be contacted after another of the applications, and computing, from the contact probabilities and the observed probabilities, application dependency scores for pairs of the applications. The method further includes using the application dependency scores to determine relationships between the applications in the pairs of applications.

20 Claims, 4 Drawing Sheets

METHODS, SYSTEMS, AND COMPUTER READABLE MEDIA FOR IDENTIFYING RELATIONSHIPS BETWEEN NETWORK APPLICATIONS FROM MONITORED NETWORK TRAFFIC

TECHNICAL FIELD

The subject matter described herein relates to network monitoring. More particularly, the subject matter described herein relates to monitoring network traffic and identifying relationships between network applications.

BACKGROUND

Parsing monitored network traffic (both copies of traffic and live network traffic) to identify applications and protocols can reveal a lot about individual network connections and applications. However, one challenge that has remained difficult is dynamic analysis of the relationships between servers and their content delivery networks, microservices, and ad networks. This problem is exacerbated by top applications adding new services and increasingly advanced load balancing through complicated domain name system (DNS) patterns and edge networks, resulting in tens of subdomains and unrelated Top Level Domains (TLDs) being referenced by top pages but not accounted for in static application pattern matching. Because of these complexities, using a web crawler to crawl an individual website in an attempt to find all of the related servers yields mixed results, due to the fact that the web site's content may not always be deterministic or may appear to be spuriously correlated.

Accordingly, in light of these and other difficulties, there exists a need for improved methods, systems, and computer readable media for identifying relationships between network applications.

SUMMARY

A method for identifying relationships between network applications from monitored network traffic includes receiving network traffic or network traffic metadata from communication sessions between web clients and web servers. The method further includes determining, from the network traffic or the network traffic metadata, counts indicating numbers of times that applications residing on the web servers are contacted after the same and other applications residing on the web servers. The method further includes computing, using the counts and for each of the applications, a contact probability. The method further includes computing, using the counts and for each of the applications, an observed probability indicating a likelihood that the application will be contacted after another of the applications. The method further includes computing, from the contact probabilities and the observed probabilities, application dependency scores for pairs of the applications, where the application dependency scores each indicate a likelihood that one application in a pair of applications is dependent on another application in the pair of applications. The method further includes using the application dependency scores to determine relationships between the applications in the pairs of applications.

According to another aspect of the subject matter described herein, receiving network traffic or network traffic metadata includes receiving network traffic at an application dependency detector executing on a network packet broker.

According to another aspect of the subject matter described herein, receiving network traffic or network traffic metadata includes receiving the network traffic or network traffic metadata at an application dependency detector residing on a network tool.

According to another aspect of the subject matter described herein, computing the contact probabilities includes, for each of the applications, dividing a count of the number of times the application was contacted by a sum of counts that all of the applications were contacted.

According to another aspect of the subject matter described herein, computing the observed probabilities includes, for each of the applications, dividing a count of a number of times the application was contacted after a first application of the applications by a sum of counts of numbers of times that that the application was contacted after all of the applications.

According to another aspect of the subject matter described herein, computing the application dependency score includes computing a Bayes match percentage for each of the pairs of applications.

According to another aspect of the subject matter described herein, using the application dependency scores to determine relationships between the applications in the pairs of applications includes using the application dependency scores to determine that one of the applications in a pair is dependent on another of the applications in the pair.

According to another aspect of the subject matter described herein, using the application dependency scores to determine relationships between the applications in the pairs of applications includes using the application dependency scores to determine that one of the applications in a pair is not dependent on another of the applications in the pair.

According to another aspect of the subject matter described herein, using the application dependency scores to determine relationships between the applications in the pairs of applications includes using the application dependency scores to determine that one of the applications in a pair represents a content delivery network for another of the applications in the pair.

According to another aspect of the subject matter described herein, using the application dependency scores to determine relationships between the applications in the pairs of applications includes using the application dependency scores to determine that one of the applications in a pair represents a microservice for another of the applications in the pair.

According to another aspect of the subject matter described herein, a system for identifying relationships between network applications from monitored network traffic is provided. The system includes a network packet broker or a network tool including at least one processor and a memory. The system further includes an application dependency detector implemented by the at least one processor for receiving network traffic or network traffic metadata from communication sessions between web clients and web servers, determining, from the network traffic or the network traffic metadata, counts indicating numbers of times that applications residing on the web servers are contacted after the same and other applications residing on the web servers, computing, using the counts and for each of the applications, a contact probability, computing, using the counts and for each of the applications, an observed probability indicating a likelihood that the application will be contacted after another of the applications, computing, from the contact probabilities and the observed probabilities, application dependency scores for pairs of the applications, where the application dependency scores each indicate a likelihood that one application in a pair of applications is dependent on another application in the pair of applications, and using the application dependency scores to determine relationships between the applications in the pairs of applications.

According to another aspect of the subject matter described herein, the network packet broker or the network tool comprises a network packet broker. The system of claim 11 wherein the network packet broker or the network tool comprises a network tool.

According to another aspect of the subject matter described herein, the application dependency detector is configured to compute the contact probabilities by, for each of the applications, dividing a count of the number of times the application was contacted by a sum of counts that all of the applications were contacted.

According to another aspect of the subject matter described herein, the application dependency detector is configured to compute the observed probabilities by, for each of the applications, dividing a count of a number of times the application was contacted after a first application of the applications by a sum of counts of numbers of times that that the application was contacted after all of the applications.

According to another aspect of the subject matter described herein, the application dependency detector is configured to compute the application dependency score by computing a Bayes match percentage for each of the pairs of applications.

According to another aspect of the subject matter described herein, the application dependency detector is configured to use the application dependency scores to determine relationships between the applications in the pairs of applications by using the application dependency scores to determine that one of the applications in a pair is dependent on another of the applications in the pair.

According to another aspect of the subject matter described herein, the application dependency detector is configured to use the application dependency scores to determine relationships between the applications in the pairs of applications by using the application dependency scores to determine that one of the applications in a pair is not dependent on another of the applications in the pair.

According to another aspect of the subject matter described herein, the application dependency detector is configured to use the application dependency scores to determine relationships between the applications in the pairs of applications by using the application dependency scores to determine that one of the applications in a pair represents a content delivery network or a microservice for another of the applications in the pair.

According to another aspect of the subject matter described herein, A non-transitory computer readable medium having stored thereon executable instructions that when executed by a processor of a computer control the computer to perform steps is provided. The steps include receiving network traffic or network traffic metadata from communication sessions between web clients and web servers. The steps further include determining, from the network traffic or the network traffic metadata, counts indicating numbers of times that applications residing on the web servers are contacted after the same and other applications residing on the web servers. The steps further include computing, using the counts and for each of the applications, a contact probability. The steps further include computing, using the counts and for each of the applications, an observed probability indicating a likelihood that the application will be contacted after another of the applications. The steps further include computing, from the contact probabilities and the observed probabilities, application dependency scores for pairs of the applications, where the application dependency scores each indicate a likelihood that one application in a pair of applications is dependent on another application in the pair of applications. The steps further include using the application dependency scores to determine relationships between the applications in the pairs of applications.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
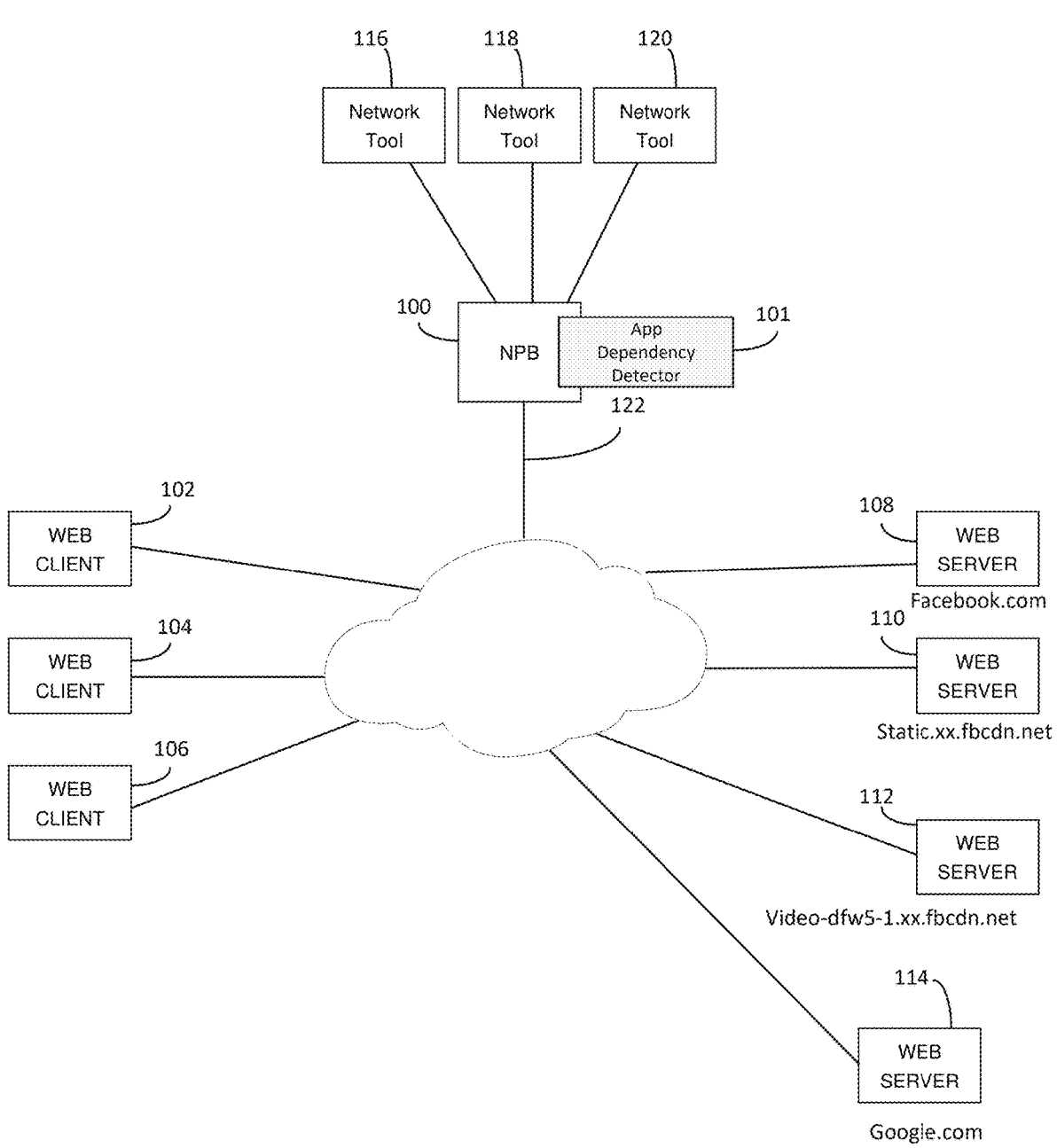
FIG. 1 is a network diagram illustrating an exemplary operating environment for the subject matter described herein.

The subject matter described herein includes a new statistical method, Detection of Applications through Bayesian Hierarchy (DAB), that uses the nature of client and server communication and an active timeout window to dynamically match servers with service providers (Google, Amazon, etc.). With a statistically significant number of client-server samples and without any prior knowledge of applications in the network, an entire hierarchy of web servers and their content delivery networks and microservices can be learned.

Bayes' Intuition

Bayes' Theorem is defined simply using the following equation to find the "conditional" probability, or the likelihood one event occurs given another.

$$P(A \mid B) = \frac{P(B \mid A)P(A)}{P(B)}$$

In the equation for Bayes' Theorem, A and B are mutually independent variables, P(A) and P(B) are the probabilities of A and B occurring independent of each other, and P(B|A) is the probability B is observed given A (Stuart, A).

P(B|A) is the only variable that must be observed directly because it contains the information we want to extrapolate. Bayes' Theorem helps us approximate the real probability that event A will occur given that event B has occurred. The following two probability examples illustrate which specific conditional probability information Bayes' Theorem is can be used to extract.

The first example is a coin flip example where two standard coins each have a heads side and a tails side. We would expect the probability of getting heads or tails to be 0.5 for both coins, which can be written as P(A)=0.5. If we perform an experiment, start flipping these coins and record the number of times we see heads versus tails, we expect the tally would be fifty-fifty. Now we're interested in the relationship between the coins. From the perspective of the observer, the coin flips are mutually independent random events. The occurrence of heads in the toss of one of the coins (P(A)=0.5) does not influence the chance of the occurrence of heads in the toss of the other coin P(B)=0.5. What if we want to bet on these coin flips? Now we want to know the chance that the first coin comes up heads AND the second coin also comes up heads. Because both of our coin flips are mutually independent variables, we can use the probability multiplication rule to calculate the chance both coins come up heads. P(A) P(B)=0.5*0.5=0.25.

In the second probability example, we introduce a coin tournament and we invite hundreds of people to bring two coins to compete in a bracket of several games of pure chance. We do not want any cheaters to use loaded coins so we want a way to detect when there might be something strange going on with the coins. Given that we know the probability of two coins in a game landing on heads is 0.25, we can detect when someone is using a loaded coin if they are consistently landing double heads at a rate greater than 25%. However, this tournament is about being lucky so how can we know when someone is using a loaded coin versus just experiencing extreme luck? We use Bayes' Theorem to answer that question.

Because we observe ALL the variables in the Bayes' Theorem equation, we can compare our expected value of 0.25 to the calculated value of Bayes' Theorem. How is this different than just comparing the actual observed outcomes to 0.25?

Bayes' Theorem will let us explicitly calculate which coin is the loaded coin.

$$P(\text{coin } 1 \mid \text{coin } 2) = \frac{P(\text{coin } 2 \mid \text{coin } 1)}{P(\text{coin } 2)}$$

Suppose we have two coins where one is loaded and one is standard. We compute Bayes' Theorem equation and find that:

$$P(\text{coin } 1 \text{ heads} \mid \text{coin } 2 \text{ heads}) > P(\text{coin } 2 \text{ heads} \mid \text{coin } 1 \text{ heads})$$

If the values computed using Bayes' Theorem are unequal, we know that inequality is not due to luck because we have the frame of reference of the standard coin to compare to the loaded coin. However, networks are complex, and there might be many types of "coins", each with a different probability of landing on heads P(A). What if instead of catching a cheater we wanted to be the cheater and pick the two coins with the highest chance of winning the game? We could select the two coins with the highest chance of winning by computing P(A | B) for every coin combination in the tournament and taking the pair with the highest probability. DAB uses this method to compare thousands of servers to see which ones are the most likely match.

Detecting Applications Through Bayesian Hierarchy

By treating each client "session" as an independent sample of a dynamic network game, DAB can answer the question what is the probability that this server appears with another server in a sequence. This works because some server connections are caused by the user entering a uniform resource locator (URL) or initiating an action in a client application, while some server connections are caused by other connections. The observing network analysis tool makes observations over an active timeout window that stays alive while the user is still interacting with the server. Each observation is a count of the number of times a server is seen after another in the same window. The columns in Tables 1 and 2 below represent the web server that was seen first, and the rows in the table represent the web server that was seen second.

FIG. 1 is a network diagram illustrating an exemplary operating environment for the subject matter described herein. Referring to FIG. 1, a network packet broker 100 including an application dependency detector 101 monitors traffic transmitted between web clients 102, 104, and 106 and web servers 108, 110, 112, and 114. Web clients 102, 104, and 106 may be any suitable clients for initiating connections with servers on the Internet. In one example, web clients 102, 104, and 106 may be web browsers. Web servers 108, 110, 112, and 114 are shown for example purposes. In the illustrated example, web server 108 is a server contactable via the URL facebook.com. Web server 110 is contactable through the URL static.xx.fbcdn.net. Web server 112 is contactable though the URL video.dfw5-1.xx.fbcdn.net. Web server 114 is contactable through the URL google.com.

The subject matter described herein seeks to determine dependency relationships between application servers by counting the number of times each application server is contacted after another application server while the connection with the first application server is still active. Such a count may be made by application dependency detector 101, which executes on network packet broker 100 and/or on one or more network tools 116, 118, and 120 that receive copied network packets and/or network packet metadata from network packet broker 100.

Figure 2:
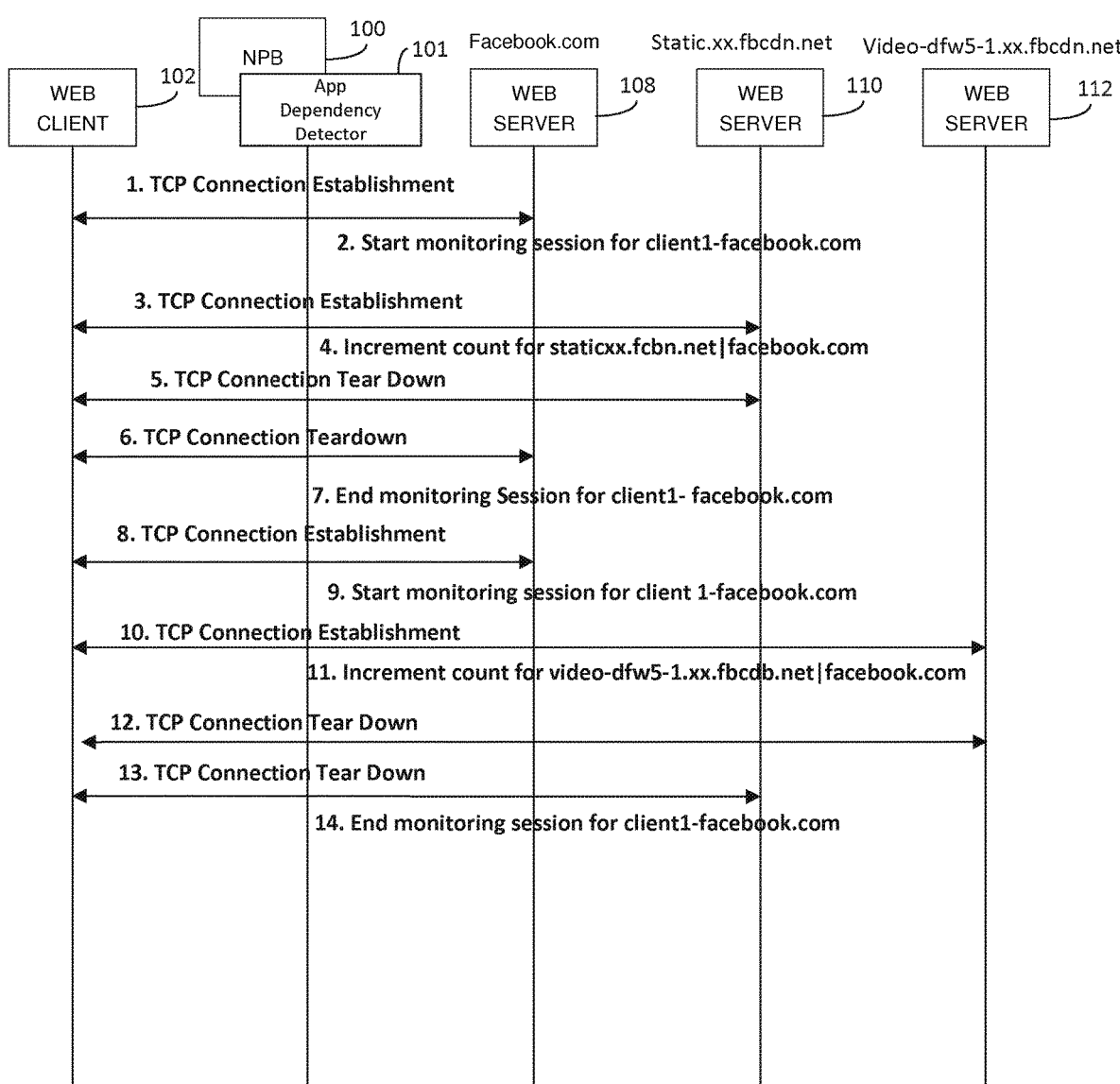
FIG. 2 is a message flow diagram illustrating examples of application contact dependency counts that may be generated by a network packet broker with an application dependency detector.

FIG. 2 is a message flow diagram illustrating examples of application contact dependency counts that may be generated by a network packet broker with an application dependency detector. Referring to FIG. 2, in step 1, web client 102 initiates transmission control protocol (TCP) connection establishment with web server 108 corresponding to the facebook.com domain. Application dependency detector 101, which in this example, resides on network packet broker 100, detects the TCP connection establishment packets, reads the domain name facebook.com from the server name indication (SNI) of one of the packets, and determines that this is a first contact to facebook.com in a new communication session for web client 102. Accordingly, in step 2, application dependency detector 101 executing on network packet broker 100 starts a monitoring session for the web client 102—facebook.com communication session. In step 3, web client 102 establishes a TCP connection with web server 110 corresponding to the URL static.xx.fbcdn-.net. In step 4, application dependency detector 101 executing on network packet broker 100 detects the new TCP connection establishment, and, in response, increments a count for static.xx.fbcdn.net as a service following facebook.com during a communication session.

In step 5, client 102 tears down the TCP connection with web server 110 corresponding to static.xx.fbcn.net. In step 6, client 102 tears down the TCP connection with web server 108 corresponding to facebook.com. In response to detecting the connection tear down, in step 7, application dependency detector 101 executing on network packet broker 100 ends the monitoring session for the web client 102—facebook.com communication session.

In step 8, client 102 establishes a new TCP connection with web server 108 corresponding to the URL facebook.com. In step 9, application dependency detector 101 executing on network packet broker 100 starts a new monitoring session for the client 102—facebook.com communication session. In step 10, client 102 establishes a TCP connection with web server 112 corresponding to the domain video-dfw5-1.xx.fbcdn.net. In step 11, application dependency detector 101 executing on network packet broker 100 increments a count for video-dfw5-1.xx.fbcdn.net as a service following facebook.com during a communication session In step 12, client 102 tears down the TCP connection with web server 112 corresponding to video-dfw5-1.xx.fbcdn.net. In step 13, client 102 tears down the TCP connection with web server 108 corresponding to facebook.com. In response to detecting the connection tear down, in step 14, application dependency detector 101 executing on network packet broker 100 ends the monitoring session for the web client 102—facebook.com communication session.

The monitoring process performed by application dependency detector 101 can be performed for a predetermined time interval and/or until a configured number of measurements are made, where the measurements are counts of applications that are contacted after other applications during a communication session. Table 1 shown below illustrates an example of counts that may be generated by application dependency detector 101.

TABLE 1

| | Facebook.com | Static.xx.fbcdn.net | Video-dfw5-1.xx.fbcdn.net |
|---|---|---|---|
| Facebook.com | 0 | 0 | 0 |
| Static.xx.fbcdn.net | 54 | 53 | 3 |
| Video-dfw5-1.xx.fbcdn.net | 4 | 3 | 3 |

Counts Generated by Application Dependency Monitor

In Table 1, each count corresponds to a number of times the server identified in a given row was contacted during communication sessions after a server identified in a column. For example, the count of 54 in the cell (static.xx.fbcdn.net, facebook.com) indicates that the server static.xx.fbcbn.net was contacted during communication sessions 54 times after facebook.com was contacted. Similarly, the value of 0 in the cell (facebook.com, static.xx.fbcdn.net) indicates that facebook.com was contacted 0 times during communication sessions after static.xx.fbcdn.net. These counts can be used to compute an application dependency score, which, in one example, is a Bayes match score. Examples of using the counts to compute the application dependency score will be described in more detail below.

Because of the active timeout window, a session can be weakly defined as the moment from first client-server communication until the user stops interacting with the service. For example, when a browser opens a connection to facebook.com, the web browser will suddenly create connections to a number of related servers, many of which look like static.xx.fbcdn.net or video-dfw5-1.xx.fbcdn.net. Application dependency detector 101 will log observations of each related server accessed while the browser still maintains a connection to the initial web server facebook.com in the manner illustrated in FIG. 2. Because the connections happen with frequent succession, it can be difficult to decipher the relationship between servers with just one session sample. Over many client sessions, patterns start to emerge revealing the true probability that one application is observed right after another. The subject matter described herein is directed to determining when a high correlation between servers is a fluke, such as the path from a google search to a banking website, versus a caused server connection, such as a connection to a content delivery network.

Table 2 shown below illustrates examples of counts that may be generated by application dependency detector 101 over a configured time period for thousands of connections.

TABLE 2

| Counts Generated by Application Dependency Detector for Thousands of Connections | | |
|---|---|---|
| | Facebook.com | Static.xx.fbcdn.net | Video-dfw5-1.xx.fbcdn.net |
| Facebook.com | 503 | 183 | 230 |
| Static.xx.fbcdn.net | 10186 | 9430 | 382 |
| Video-dfw5-1.xx.fbcdn.net | 5104 | 203 | 3147 |

From Table 2, the relationship between facebook.com and its content delivery networks only becomes clear when the possibility that static.xx.fbcdn.net belongs to itself is removed, as shown by the count of 9430 in the cell (static.xx.fbcdn.net, static.xx.fbcdn.net).

Detecting Subdomains Versus Unique Applications

Application dependency detector 101 can compute the probability that the server static.xx.fbcdn.net belongs to facebook.com by computing the P(static.xx.fbcdn.net|facebook.com) using the values in Table 2. Computing this probability for each application in the first column will yield a percentage probability that each application in the first column is seen after each of the applications in the column headers. For example, for static.xx.fbcdn.net, the probability that static.xx.fbcdn.net comes after facebook.com, static.fbcdn.net, and video-dfw5-1.xx.fbcdn.net can be computed. Sorting the probabilities will give a ranking for likelihood that static.xx.fbcdn.net belongs to any specific application. After a statistically significant amount of samples have been collected, the application with the highest ranking percentage is the application that belongs to or is related to facebook.com.

Application dependency detector 101 can distinguish the directionality of the relationship between applications by computing: P(static.xx.fbcdn.net|facebook.com) and comparing this probability to P(facebook.com|static.xx.fbcdn.net). There are three possibilities:

1. If P(static.xx.fbcdn.net|facebook.com)> P(facebook.com|static.xx.fbcdn.net), then server static.x.fbcdn.net more likely belongs to server facebook.com (than vice versa).

2.    If    P(static.xx.fbcdn.net|facebook.com)<P (facebook.com|static.xx.fbcdn.net), then server facebook.com more likely belongs to server static.xx.fbcdn.net (than vice versa).

3. Both P(static.xx.fbcdn.net|facebook.com) and P(facebook.com|static.xx.fbcdh.net) are close to 0%, so the relationship is thrown out as unrelated.

In practice, a ranking is computed for every server against every other server and only the top applications above the match threshold are considered using the criteria above to determine if one server or application belongs to another. Tables 3-6 shown below illustrate examples of probabilities and match scores that may be computed by application dependency detector 101.

TABLE 3

Percentages of Total Traffic Volume

| Server Name | Percentage of Total Traffic Volume |
|---|---|
| Facebook.com | 50.63% |
| Static.xx.fbcdn.net | 37.32% |
| Video-dfw5-1.xx.fbcdn.net | 12.05% |

The percentages in Table 3 are calculated from the observations in Table 2. Taking facebook.com as an example, the percentage of total traffic volume for facebook.com, which is treated herein as the contact probability for facebook.com, can be computed as follows:

$$P(facebook.com) = \frac{\text{observations of } facebook.com}{\text{total observations}}$$
$$= \frac{503 + 10186 + 5104}{503 + 10186 + 5104 + 183 + 9430 + 2030 + 230 + 382 + 3147}$$
$$= 50.63\%$$

Similarly, $$P(static.xx.fbcdn.net) = \frac{\text{observations of } static.xx.fbcdn.net}{\text{total observations}}$$
$$= \frac{183 + 9430 + 2030}{503 + 10186 + 5104 + 183 + 9430 + 2030 + 230 + 382 + 3147}$$
$$= 37.32\%$$

To compute a Bayes match percentage for static.xx.fbcdn.net given facebook.com, application dependency detector 101 may use Bayes' Theorem as follows:

$$P(static.xx.fbcdn.net \,|\, facebook.com) = \qquad (1)$$

$$\frac{P(facebook.com \,|\, static.xx.fbcdn.net)P(static.xx.fbcdn.net)}{P(facebook.com)}$$

Using the data in Table 2, P(facebook.com) is calculated above to be 50.63%, and P(static.xx.fbcdn.net) is calculated to be 37.32%. The observed probability that static.xx.fbcdn.net is contacted after facebook.com, P(facebook.com|static.xx.fbcdn.net), can be calculated from the values in Table 3 as follows:

$$P(facebook.com \,|\, static.xx.fbcdn.net) = \frac{10186}{10186 + 9430 + 382} = 50.93\% \qquad (2)$$

The Bayes match percentage for static.xx.fbcdn.net given facebook.com can be calculated by inserting the calculated probabilities into Equation 1 as follows:

$$P(static.xx.fbcdn.net \,|\, facebook.com) = \frac{(.5093)(.3732)}{(.5063)} = 37.54\%$$

Table 4 shown below illustrates observed probabilities calculated similarly to P(facebook.com|static.xx.fbcdn.net) in Equation 2.

TABLE 4

Observed Probabilities

| Observed Probabilities | Calculated Values |
|---|---|
| P(facebook.com|facebook.com) | 20.82% |
| P(facebook.com|static.xx.fbcdn.net) | 50.93% |
| P(facebook.com|video-dfw5-1.xx.net) | 49.64% |

The observed probabilities P(A|B) in Table 4 can be read as the number of times server B was observed to be contacted after server A. From the probabilities in Tables 3 and 4, the Bayes match percentages can be computed using Equation 1. Table 5 illustrates Bayes match percentages computed using the data in Table 2.

TABLE 5

Bayes Match Percentages

| Bayesian Match Percentages | Calculated Values |
|---|---|
| P(facebook.com|facebook.com) | 20.82% |
| P(static.xx.fbcdn.net|facebook.com) | 37.54% |
| P(video-dfw5-1.xx.net|facebook.com) | 11.82% |

The Bayes match percentages in column 2 of Table 5 can be used as application dependency scores for each domain given facebook.com because they indicate a globally adjusted percentage indicating the number of times each domain will be encountered after facebook.com. From the data, the domain static.xx.fbcdn.net is the most likely domain to be dependent on facebook.com. The network test operator can set thresholds such that an application is indicated as dependent on another application if the application dependency score is greater than the threshold.

The data in Tables 2-5 illustrates an example of how top applications are strongly related to their content delivery networks. One thing to note is that because our example network is small, with only 3 applications, the observed probabilities are quite high. Just like in the coin example, if the game is simple it is easy to spot with pure intuition which coin is a loaded coin, however, in a more complicated game where the correlations may not be clear and many servers are making connections at the same time the Bayes match score becomes a more important delineator that helps you weed out spurious correlations.

Internet Protocol (IP) Address Matching

In some instances, a web server will use a protocol that does not reveal its identity or is performance intensive to parse. In these cases, it would be convenient to use only the IP address to correlate the traffic with other known web servers. One difficulty with this approach is the fact that, with the introduction of server name indicator, SNI, multiple web services can be hosted at the same IP address. Fortunately, the Bayes match score can deal with this problem by decreasing the match percentage automatically for IP addresses of servers that host more than one service. A separate system would need to be implemented to more accurately detect how many web services are being hosted from a single IP address.

CONCLUSION

Using Bayesian statistics, application dependency detector 101 can derive the relationships between applications and dynamically identify new micro-services and content delivery networks for top applications. These newly identified applications can be added to existing static application signatures after they are discovered and enough session samples have been recorded to reduce performance penalty of computing the Bayes match score. Over time, even without prior knowledge of most applications in the network a full dependency tree of applications can be derived and most traffic can be correctly matched to top service providers who make up the majority of traffic.

Summary and Exemplary Implementation

Figure 3:
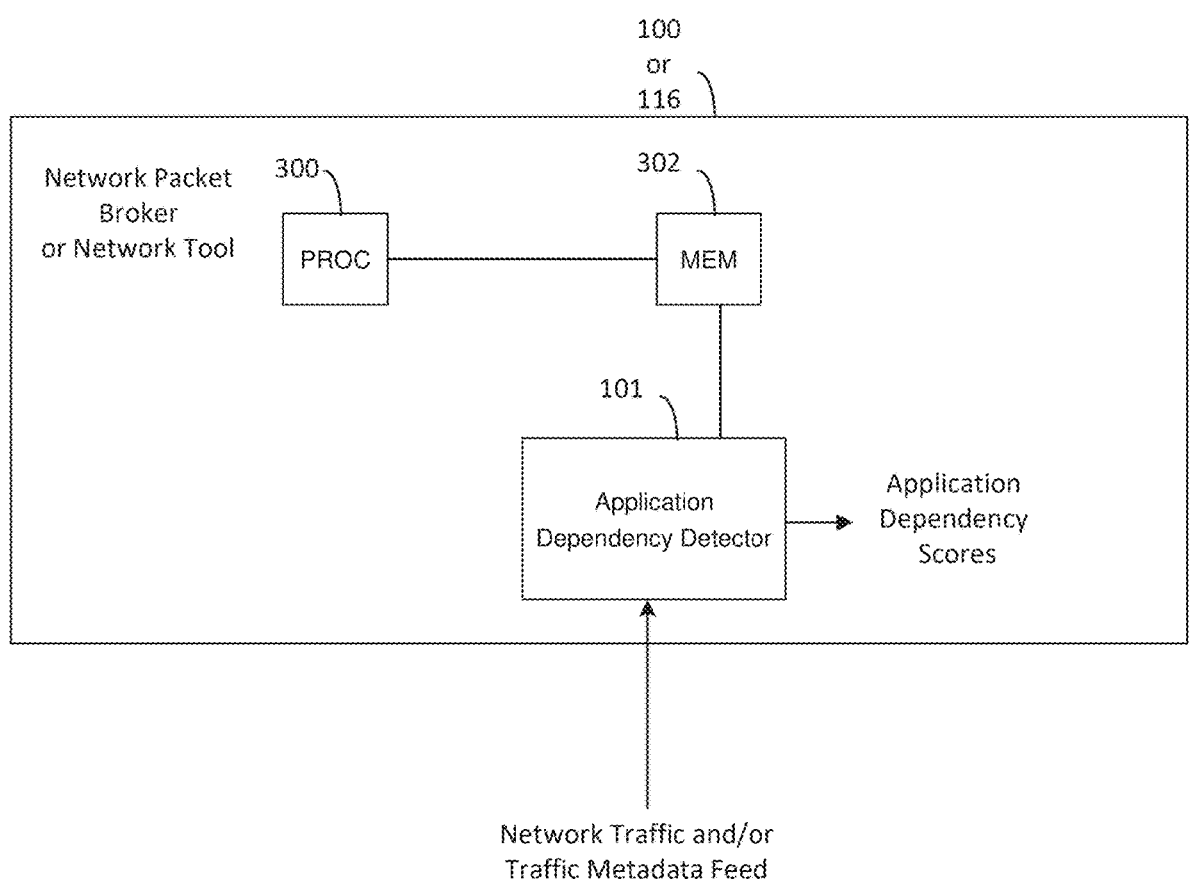
FIG. 3 is a block diagram illustrating a network packet broker or a network tool that includes an application dependency detector.

FIG. 3 is a block diagram illustrating a network packet broker or a network tool that includes application dependency detector 101. Referring to FIG. 3, network packet broker or network tool 100 or 116 includes at least one processor 300 and memory 302. Network packet broker or network tool 100 or 116 includes an application dependency detector 101 that receives network traffic and or network traffic metadata feeds and outputs application dependency scores as described above. Application dependency detector 101 may be implemented using computer executable instructions stored in memory 302 and executed by processor 300.

Figure 4:
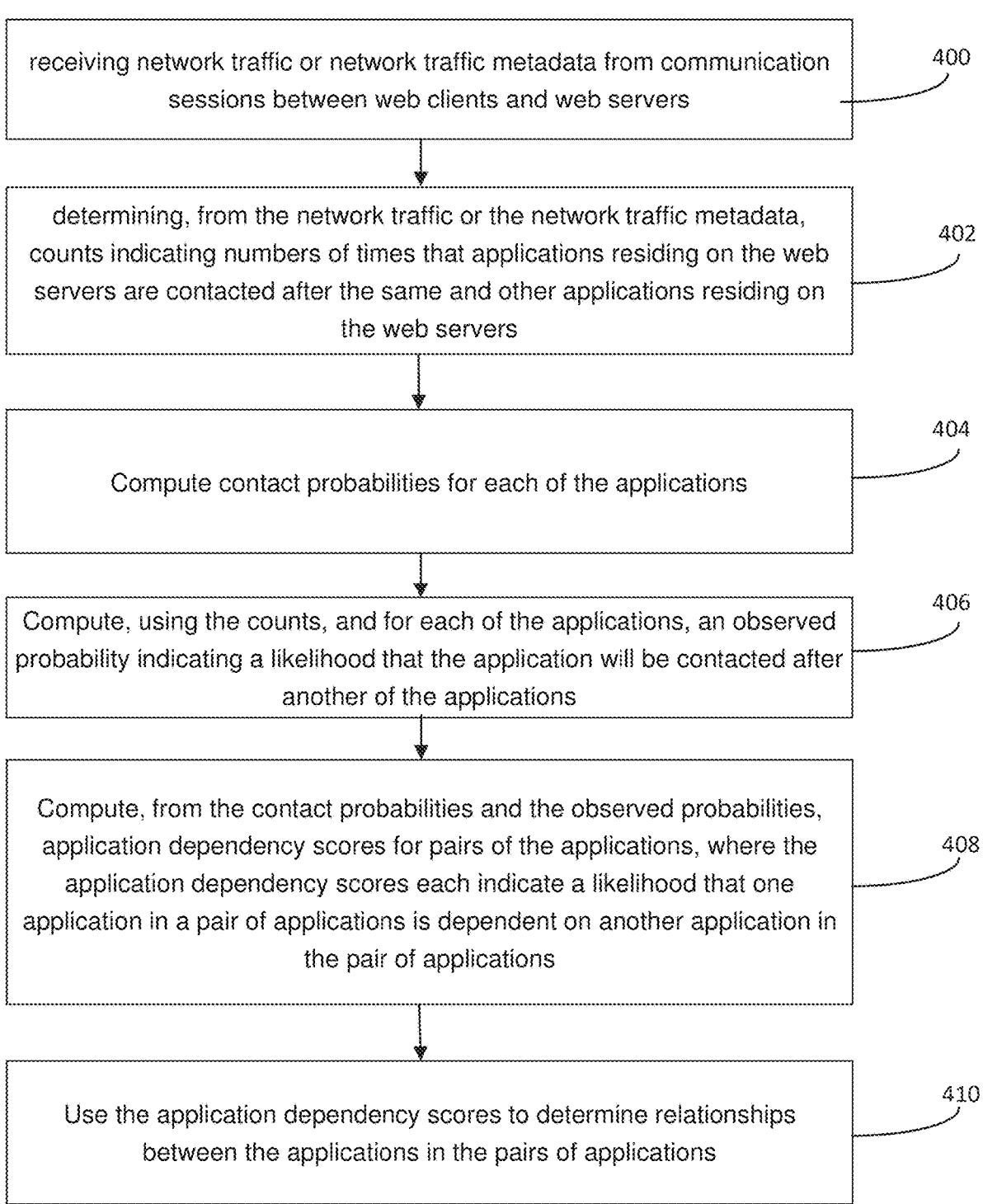
FIG. 4 is a flow chart illustrating an exemplary process for identifying relationships between network applications from monitored network traffic.

FIG. 4 is a flow chart illustrating an exemplary process for identifying relationships between network applications from monitored network traffic. Referring to FIG. 4, in step 400, the process includes receiving network traffic or network traffic metadata from communication sessions between web clients and web servers. For example, application dependency detector 101 may reside on a network packet broker or a network tool and receive either an network traffic feed copied from communications between web clients and web servers or network traffic metadata generated from such a feed, where the network traffic metadata can include information identifying communication sessions between the web clients and the web servers.

In step 402, the process includes determining, from the network traffic or the network traffic metadata, counts indicating numbers of times that applications residing on the web servers are contacted after the same and other applications residing on the web servers. For example, application dependency detector 101 may maintain counts, examples of which are illustrated above in Tables 1 and 2, of the numbers of times each of the applications is contacted after another of the applications. In addition, application dependency detector 101 may maintain a count indicating a number of times that an application is contacted after being contacted a first time during a communication session.

In step 404, the process incudes computing contact probabilities for each of the applications. For example, application dependency monitor may compute probabilities indicating the number of times each of the applications is contacted as a percentage of total traffic volume during a monitoring period. Examples of contact probabilities that may be computed by application dependency detector 101 are illustrated above in Table 3.

In step 404, the process includes computing, using the counts, and for each of the applications, an observed probability indicating a likelihood that the application will be contacted after another of the applications. For example, application dependency detector 101 may compute, from observations, probabilities that the applications being monitored are contacted after other applications being monitored. Examples of the observed probability calculations are illustrated above in Table 4.

In step 406, the process includes computing, from the contact probabilities and the observed probabilities, application dependency scores for pairs of the applications, where the application dependency scores each indicate a likelihood that one application in a pair of applications is dependent on another application in the pair of applications. For example, application dependency detector 101 may compute a Bayes match score using the percentages of total traffic volume and the observed probabilities In step 410, the process includes using the application dependency scores to determine relationships between the applications in the pairs of applications. For example, application dependency detector 101 may use the application dependency scores to determining that an application is dependent on or not dependent on another application, that one application represents a content delivery network of another application and/or that one application is a micro-service of another application. For example, if the application dependency score for one application given another application is above a threshold, application dependency detector 101 may determine that the application is dependent on the other application. If the application dependency score is below the threshold, application dependency detector 101 may determine that the application is not dependent on the other application. If the application dependency score indicates is above the threshold, and the type of traffic being delivered is video or other media content, application dependency detector may determine that the application represents a content delivery network or a microservice of the other application. In another example, application dependency detector 101 may compare the application dependency scores for all applications encountered after a particular application and select the application with the highest application dependency score as being dependent on the particular application.

The disclosure of each of the following references is incorporated herein by reference in its entirety.

REFERENCES

Stuart, A.; Ord, K. (1994), Kendall's Advanced Theory of Statistics: Volume I—Distribution Theory, Edward Arnold, § 8.7

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying application dependencies from monitored network traffic, the method comprising:

receiving network traffic or network traffic metadata from communication sessions between web clients and web servers;

determining, from the network traffic or the network traffic metadata, counts indicating numbers of times that applications residing on the web servers are contacted after the same and other applications residing on the web servers;

computing, using the counts and for each of the applications, a contact probability;

computing, using the counts and for each of the applications, an observed probability indicating a likelihood that the application will be contacted after another of the applications;

computing, from the contact probabilities and the observed probabilities, application dependency scores for pairs of the applications, where the application dependency scores each indicate a likelihood that one application in a pair of applications is dependent on another application in the pair of applications; and using the application dependency scores to determine relationships between the applications in the pairs of applications.

2. The method of claim 1 wherein receiving network traffic or network traffic metadata includes receiving network traffic at an application dependency detector executing on a network packet broker.

3. The method of claim 1 wherein receiving network traffic or network traffic metadata includes receiving the network traffic or network traffic metadata at an application dependency detector residing on a network tool.

4. The method of claim 1 wherein computing the contact probabilities includes, for each of the applications, dividing a count of the number of times the application was contacted by a sum of counts that all of the applications were contacted.

5. The method of claim 1 wherein computing the observed probabilities includes, for each of the applications, dividing a count of a number of times the application was contacted after a first application of the applications by a sum of counts of numbers of times that that the application was contacted after all of the applications.

6. The method of claim 1 wherein computing the application dependency score includes computing a Bayes match percentage for each of the pairs of applications.

7. The method of claim 1 wherein using the application dependency scores to determine relationships between the applications in the pairs of applications includes using the application dependency scores to determine that one of the applications in a pair is dependent on another of the applications in the pair.

8. The method of claim 1 wherein using the application dependency scores to determine relationships between the applications in the pairs of applications includes using the application dependency scores to determine that one of the applications in a pair is not dependent on another of the applications in the pair.

9. The method of claim 1 wherein using the application dependency scores to determine relationships between the applications in the pairs of applications includes using the application dependency scores to determine that one of the applications in a pair represents a content delivery network for another of the applications in the pair.

10. The method of claim 1 wherein using the application dependency scores to determine relationships between the applications in the pairs of applications includes using the application dependency scores to determine that one of the applications in a pair represents a microservice for another of the applications in the pair.

11. A system for identifying application dependencies from monitored network traffic, the system comprising:

a network packet broker or a network tool including at least one processor and a memory; and an application dependency detector implemented by the at least one processor for receiving network traffic or network traffic metadata from communication sessions between web clients and web servers, determining, from the network traffic or the network traffic metadata, counts indicating numbers of times that applications residing on the web servers are contacted after the same and other applications residing on the web servers, computing, using the counts and for each of the applications, a contact probability, computing, using the counts and for each of the applications, an observed probability indicating a likelihood that the application will be contacted after another of the applications, computing, from the contact probabilities and the observed probabilities, application dependency scores for pairs of the applications, where the application dependency scores each indicate a likelihood that one application in a pair of applications is dependent on another application in the pair of applications, and using the application dependency scores to determine relationships between the applications in the pairs of applications.

12. The system of claim 11 wherein the network packet broker or the network tool comprises a network packet broker.

13. The system of claim 11 wherein the network packet broker or the network tool comprises a network tool.

14. The system of claim 11 wherein the application dependency detector is configured to compute the contact probabilities by, for each of the applications, dividing a count of the number of times the application was contacted by a sum of counts that all of the applications were contacted.

15. The system of claim 11 the application dependency detector is configured to compute the observed probabilities by, for each of the applications, dividing a count of a number of times the application was contacted after a first application of the applications by a sum of counts of numbers of times that that the application was contacted after all of the applications.

16. The system of claim 11 wherein the application dependency detector is configured to compute the application dependency score by computing a Bayes match percentage for each of the pairs of applications.

17. The system of claim 11 wherein the application dependency detector is configured to use the application dependency scores to determine relationships between the applications in the pairs of applications by using the application dependency scores to determine that one of the applications in a pair is dependent on another of the applications in the pair.

18. The system of claim 11 wherein the application dependency detector is configured to use the application dependency scores to determine relationships between the applications in the pairs of applications by using the application dependency scores to determine that one of the applications in a pair is not dependent on another of the applications in the pair.

19. The system of claim 11 wherein the application dependency detector is configured to use the application dependency scores to determine relationships between the applications in the pairs of applications by using the application dependency scores to determine that one of the applications in a pair represents a content delivery network or a microservice for another of the applications in the pair.

20. A non-transitory computer readable medium having stored thereon executable instructions that when executed by a processor of a computer control the computer to perform steps comprising:

receiving network traffic or network traffic metadata from communication sessions between web clients and web servers;

determining, from the network traffic or the network traffic metadata, counts indicating numbers of times that applications residing on the web servers are contacted after the same and other applications residing on the web servers;

computing, using the counts and for each of the applications, a contact probability;

computing, using the counts and for each of the applications, an observed probability indicating a likelihood that the application will be contacted after another of the applications;

computing, from the contact probabilities and the observed probabilities, application dependency scores for pairs of the applications, where the application dependency scores each indicate a likelihood that one application in a pair of applications is dependent on another application in the pair of applications; and using the application dependency scores to determine relationships between the applications in the pairs of applications.

* * * * *